Figure 1:
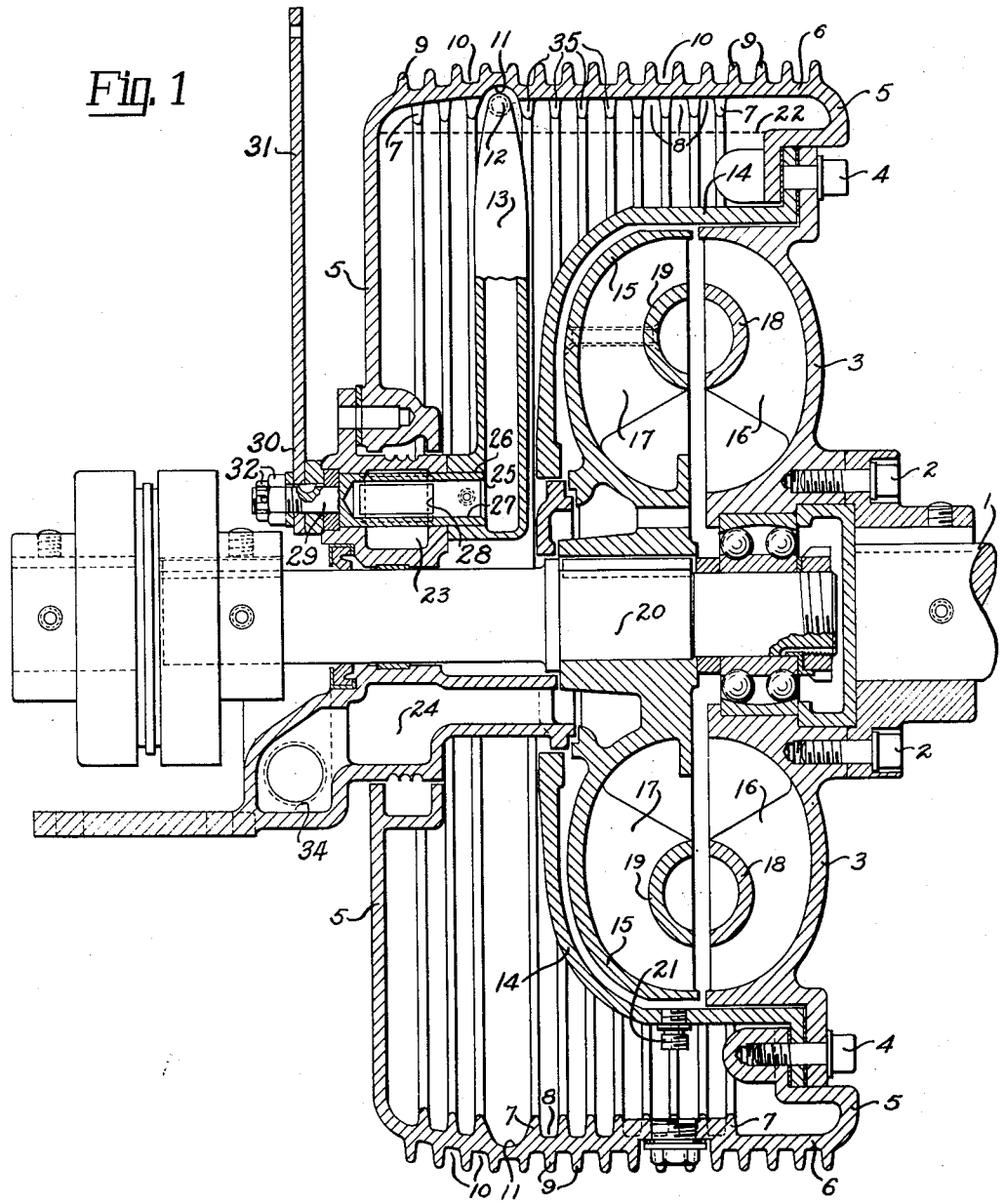

May 28, 1940.  N. L. ALISON  2,202,243

COOLING RIBS-SCOOP CONTROLLED COUPLING

Filed June 9, 1938  2 Sheets-Sheet 1

Inventor
NOAH L. ALISON

By
Attorneys

Patented May 28, 1940

2,202,243

UNITED STATES PATENT OFFICE 2,202,243

COOLING RIBS-SCOOP CONTROLLED COUPLING

Noah L. Alison, Detroit, Mich., assignor to American Blower Corporation, Detroit, Mich., a corporation of Delaware Application June 9, 1938, Serial No. 212,757

6 Claims. (Cl. 60—54)

My invention relates to hydraulic couplings and, in particular, to variable speed hydraulic couplings.

The object of this invention is to provide a hydraulic coupling so constructed as to dissipate heat.

It is an object to provide a hydraulic coupling of the variable speed type (variable filling) in which the heat from the oil is rapidly dissipated in order that the oil may not become damaged from overheating.

It is a further object to provide such an arrangement that this heat dissipation will be sufficient to eliminate oil coolers heretofore supplied, particularly in connection with small power applications, where the omission of an oil cooler so reduces the cost as to make it feasible to employ couplings of this type in fields not heretofore possible.

In particular, it is the object of this invention to provide an oil cooling arrangement by which the inner surface of the coupling is extended so as to facilitate the transfer of heat from the fluid in the coupling to the metal of the casing; and the outer surface is extended in order to transfer the heat from the metal of the casing to the surrounding air with the result that the heating is more rapidly transmitted from the oil to the surrounding air.

It is a further object to stagger the cooling ribs on the inside and outside of the casing in order to avoid weakening the casing wall unduly, as would be the case if the outer and inner ribs were aligned, with the resultant effect of weak sections at the points of nearest approach of the internal and external valleys between the internal and external ridges.

It is a further object to provide a casing, in which the ribs on the interior of the casing act not only as a heat transfer means, but also as a guide for the body fluid on the interior of the casing.

It is a further object to provide a scoop tube in association with this portion of the outer part of the casing.

In a hydraulic coupling of the variable speed type (variable filling), its efficiency is in direct proportion to the ratio of the speed between the secondary member which is on the driven shaft and the primary member which is on the driving shaft. The power lost through the coupling shows up in heat in the fluid inside the coupling, and must be dissipated in order that this fluid may not become damaged from overheating.

The primary member of the coupling, operating at the speed of the constant speed driving motor, due to its external surface velocity through the atmosphere, has a very high heat dissipation per unit of area. As a matter of fact, this reaches a figure of from ten to twenty B. t. u. per square foot per degree difference between the temperatures of the fluid on the inner surface and the atmosphere adjacent to the outer surface. In order to increase this heat dissipation, therefore, I have increased the area of a given size coupling by the use of extended surface. I find, however, that when the outer surface is increased beyond a certain point, the limiting factor is the inner surface area which is in contact with the oil stored in the outer casing in order to decrease the speed of the runner by allowing more slip. By increasing the amount of inner surface using extended ribs, a greater amount of heat from the fluid is transferred to the metal itself, which heat in turn is dissipated more readily by the extended surface on the outside of the casing.

Figure 2:
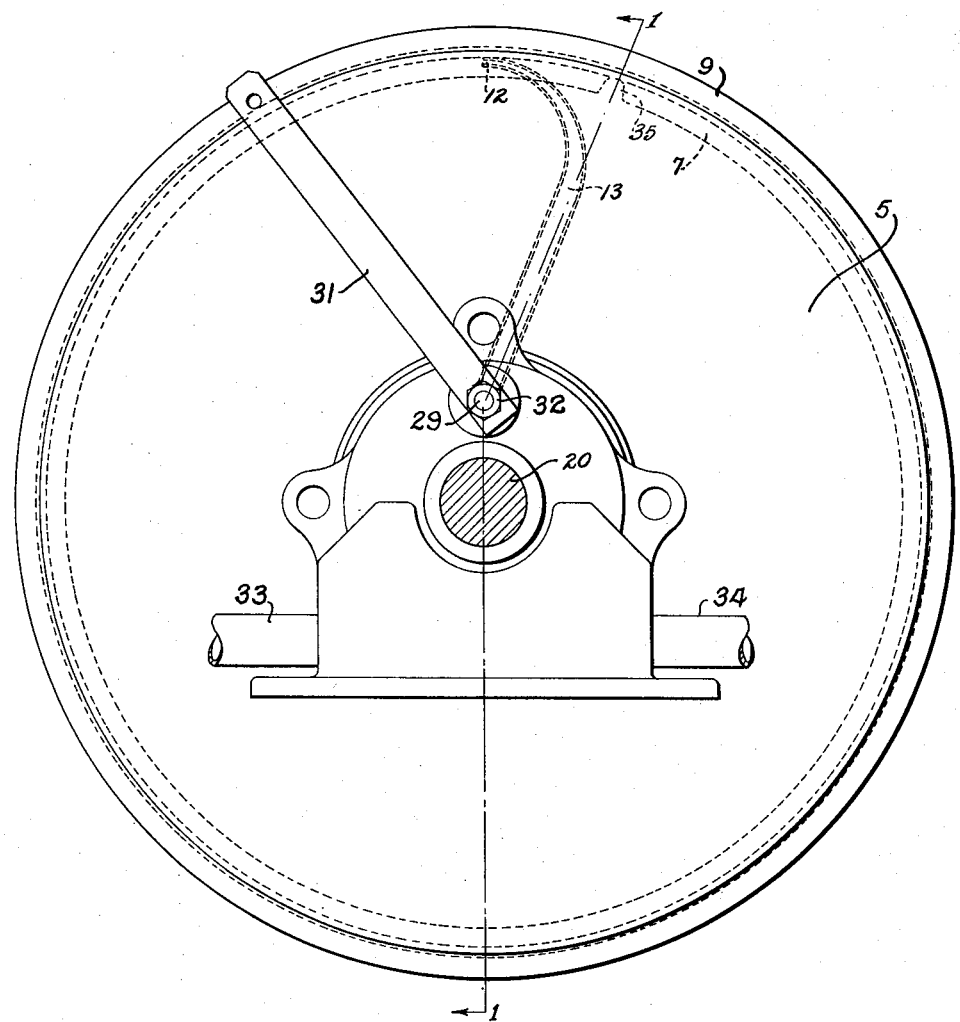

In the drawings:

Figure 1 is a vertical section on the line 1—1 of Figure 2, showing the arrangement of the coupling and the heat transfer ribs on the inside and outside of the casing; and Figure 2 is an end elevation of the coupling.

Referring to the drawings in detail, 1 designates the input shaft, upon which is bolted by bolts 2 the impeller 3. The impeller 3 has bolted thereto by bolts 4 the reservoir casing 5 which has a rotating oil rim 6, on the inside of which is a plurality of spaced annular ribs 7 with spaces 8 therebetween. The exterior is provided with ribs 9 with spaces 10 therebetween. The ribs and spaces are so arranged that the rib 7 on the inside is opposite the space 10 on the outside, and the rib 9 on the outside is opposite the space 8 on the inside.

Associated with this rotating oil rim of the casing 5 is a groove 11 for receiving the end 12 of the scoop tube 13. The details of mounting and adjusting this scoop tube form no part of the present invention. The scoop tube 13 is mounted upon and secured to a tubular shaft 25 rotatable within the bore 26. The scoop tube bore 27 communicates through a port 28 with the fluid passageway 23. The outer end of the tubular shaft 27 is provided with a threaded stem to which an operating lever 31 is secured, as by the nuts 32. The bolts 4 also retain in position the inner casing 14. Within this inner casing is the runner 15. The impeller and runner are provided with the usual vanes 16 and 17 respectively and with core rings 18 and 19. The runner 15 is mounted upon the shaft 20 and turns with it. This is the output shaft. 21 designates one of the leak-off nozzles or orifices which are mounted in the inner casing 14.

It will be noted that the inner ribs 7 extend into the body of oil that is thrown out centrifugally and the depth of which is indicated by the dotted line 22. The oil is circulated normally through the passageways 23 and 24 to and from the oil cooler by way of the conduits 33 and 34, in which case the passageways 23 and 24 are independent and not interconnected. In smaller installations, however, the arrangement of the internal and external ribs on the casing transfers and dissipates the heat from the working fluid so effectively as to eliminate the necessity for such an oil cooler. In the latter case the passageways 23 and 24 are interconnected, thereby resulting in a corresponding marked reduction in cost and the opening up of new uses for couplings of this type.

When the impeller which carries outer casing 5 is operating, the oil within the casing assumes the form of an annular body inside of the oil rim 6. The depth of this body of oil is affected by the location of the scoop tube, and consequently the amount of oil which has been taken from the casing storage for use in the working chamber of the coupling in order to impart power and speed to the runner. Fins 7 are of such height that when the oil requires the greatest amount of cooling the depth in storage on the inside of the rim 6 approximately coincides with the depth of fins, and the flow of oil to the trough 11 must be through the valleys 8, thus producing a maximum cooling effect at this time. Thus, a large extended area is presented to a moving body of oil. As a consequence, the oil is cooled rapidly because the heat is transferred through the ribs or fins 7 to the casing 5, and between the ribs as at 8. This facilitates the rapid transmission of heat through the annular rim 6, ribs 9 and valleys 10 of the casing 5 as it rotates and circulates the external air.

When the oil from the outer casing is put into the working chamber by positioning the scoop tube as close to the inside of the casing as possible, there is very little slip in the runner, so that its speed is approximately the same as the impeller speed. Under these conditions there is very little heat to dissipate, and very little oil in the outer casing.

In order that this oil in the outer casing can get into the groove or trough 11 provided for the scoop tube end 12, portions of the fins are cut away on the inside or left out, to form a groove as at 35, thus permitting the small amount of oil in the casing at such time to flow to the trough 11, so that the scoop tube end 12 can pick it up and return it to the working chamber.

The quantity of oil which flows through the leak-off nozzles or orifices 21 from the working chamber is the quantity required to keep the oil or fluid cool. The orifices 21 are varied in size, depending upon the impeller speed to produce a satisfactory flow of oil. The greatest amount of cooling is probably required when the runner is operating at about sixty-five percent. of the speed of the impeller. Under such conditions the scoop tube has been rotated so as to permit a certain amount of oil to accumulate on the inside of the casing 5, thus removing it from the working chamber. Under such conditions, the oil is bound to be sluggish in this casing 5 and for that reason the fins are placed on the inside to try and overcome the fact that the movement of the oil is slow, consequently must be offset by a greater amount of contact surface.

When it is desired to stop the runner, the scoop tube is adjusted by its hand lever 31 to the point where the distance of its orifice from the inside of the casing 5 is maximum, and practically all of the oil from the working chamber is then stored in the casing 5, around the perimeter. Under such conditions no cooling is required because there is no flow of oil through the coupling and no work done.

As the scoop is moved so as to bring the orifice nearer the inside perimeter and thus pick up some of the oil in the orifice 12 and deliver it to the working chamber of the coupling, the runner begins to rotate, and its speed depends upon the amount of oil that is taken out of the storage space in the casing 5 by the scoop tube and placed in the working chamber. When the runner gets up to a speed so that it is approximately operating at sixty-five per cent. of the speed of the impeller, part of the oil storage from the space in the casing 5 is in the working chamber. The oil circulated through the orifices 21 from the working chamber and picked up by the scoop tube orifice 12 is agitated, and flows through the oil stored in the space in the casing 5, affecting the temperature of this stored oil and increasing the degree of heat which passes through the fins and casing. This heat is transmitted through the casing and is dissipated to the outside air by the outside of the casing and fins 9.

As more oil is taken from the casing 5 by the scoop tube and placed in the working chamber, the runner speed increases. This decreases the depth of oil on the inside of the casing 5, and may somewhat affect the area of contact between the oil and the casing. Under these conditions, however, the amount of heat to be dissipated is less. When a minimum amount of oil is in the storage space 5, there is a minimum amount of heat to transfer because there is very little slippage in the runner speed and consequently very little power wasted in heating the oil.

I, therefore, provide a casing having inner and outer ribs, which rotates: a body of oil which is relatively shallow that rotates with, partially, and on the inside of the casing and is spread out over the inside of the casing by centrifugal force over the maximum possible area of the metal of the casing. I provide oppositely disposed ribs which are cooled by being rotated through the air so that the heat absorbed by the ribs from the walls 6 of the casing 5 and from the ribs 7, which heat, in turn, has been absorbed by the oil, can be rapidly dissipated into the surrounding air, as that air is constantly changing due to the fact that the ribbed casing is rotating in it and causing it to move so that the heated air moves away from the casing and fresh unheated air takes its place, so that the casing acts somewhat like a fan for churning and moving the air, while at the same time is acting as a container for the oil and the means for presenting extended surfaces both to the oil and to the air.

This invention requires no special equipment such as coolers, fans, and the like, but is entirely self-contained.

It will be understood that I desire to comprehend within my invention such modifications as come within the scope of the claims and the invention.

Having thus fully described my invention, what I claim as new and desire to secure by Letters Patent is:

1. In a hydraulic coupling, a coupling, a casing connected thereto and rotating therewith, said casing having inner and outer ribs whereby the oil in the casing is thrown out peripherally against the inner ribs and heat from said oil is transmitted through said casing to the outer ribs and thence to the air.

2. In a hydraulic coupling, a coupling, a casing connected thereto and rotating therewith, said casing having inner and outer ribs whereby the oil in the casing is thrown out peripherally against the inner ribs and heat from said oil is transmitted through said casing to the outer ribs and thence to the air, said ribs being so arranged as to be staggered on the inside and outside with respect to one another while in annular alignment.

3. In combination, a drive shaft and an impeller, an inner casing and an oil reservoir casing mounted thereon and rotating therewith, a driven shaft and runner mounted within said inner casing, and a plurality of inner and outer ribs mounted on the peripheral wall of said reservoir casing, whereby oil thrown out centrifugally will engage the inner ribs and heat therefrom will be transmitted to the surrounding air by the outer ribs as they rotate through the air and move the air.

4. In a hydraulic coupling of the variable speed type having means for a variable filling, an oil reservoir casing associated with said coupling comprising an extended annular drum-shaped body having internal and external ribs oppositely disposed in staggered relationship to one another, whereby heated oil thrown out centrifugally in a relatively thin body on the interior of said casing will have its heat dissipated through said casing and into the surrounding cool air.

5. In combination, a hydraulic coupling, an oil reservoir casing connected thereto and turning therewith comprising an annular body having a laterally extended portion overlapping the coupling to form an extended container for oil centrifugally thrown out against the interior thereof, and a plurality of ribs on the interior and exterior of the peripheral portion of said casing arranged in spaced parallel relationship.

6. In a hydraulic coupling, a coupling, a casing connected thereto and rotating therewith, said casing having inner and outer ribs whereby the oil in the casing is thrown out peripherally against the inner ribs and heat from said oil is transmitted through said casing to the outer ribs and thence to the air, a trough extending peripherally of said casing, and a groove formed in said inner ribs transverse to said trough, said groove being formed by cutting away portions of said inner ribs to said casing.

NOAH L. ALISON.